Patented Feb. 13, 1923.

1,445,080

UNITED STATES PATENT OFFICE.

MARION M. HARRISON, OF AKRON, OHIO, ASSIGNOR TO THE MILLER RUBBER COMPANY, OF AKRON, OHIO, A CORPORATION OF OHIO.

MANUFACTURE OF DIPPED RUBBER GOODS.

No Drawing. Application filed October 30, 1922. Serial No. 598,023.

*To all whom it may concern:*

Be it known that I, MARION M. HARRISON, a citizen of the United States, and resident of Akron, in the county of Summit and State of Ohio, have invented certain new and useful Improvements in the Manufacture of Dipped Rubber Goods, of which the following is a specification.

My present invention relates to improvements in the manufacture of rubber goods in which the rubber is applied or used in the form of a liquid solution of rubber in a volatile solvent, which is used as a coating or impregnating composition, the evaporation of the solvent leaving a rubber coating which is subsequently vulcanized. Such liquid cements are used for impregnating and waterproofing fabrics and also in the manufacture of certain articles composed wholly of thin rubber, such as surgeon's gloves, finger cots, and the like.

In the impregnating or water-proofing of fabrics, the fabric articles themselves may be dipped directly in, or have the liquid cement otherwise applied thereto in the well known ways, while in the production of articles made wholly of rubber, a core of the shape of the desired article is provided, which core is dipped one or more times in the liquid which forms a coating thereon. In either case, the coating is subsequently vulcanized. I have found that by adding to or incorporating in the cement a small proportion of butyl aldehyde, the durability of the articles is greatly increased and their lifetime in use is practically doubled.

The invention comprises the novel method and article hereinafter described and particularly defined in the appended claims. According to my present invention I prepare a rubber cement or solution of rubber in a volatile solvent of any approved type, and add thereto or incorporate therewith a small proportion of butyl aldehyde, say from three to ten per cent. Such a cement may comprise for example, a mixture of Pará rubber and gasoline in the proportions of three gallons of gasoline to one pound of Pará rubber, to which I add one fluid ounce of butyl aldehyde. The rubber may be cut or divided into small pieces and subjected to the action of the gasoline until dissolved therein, and the butyl aldehyde added and the mixture agitated until a uniform cement is produced. Thereafter the forms are dipped in the cement compound in the customary manner to produce the coating.

When the forms are properly covered the coating is vulcanized, preferably by the use of sulphur chloride, either by the cold process or vapor process as ordinarily practiced. I have found that a small percentage of the butyl aldehyde remains in the finished article.

Having thus described my invention, what I claim is:

1. The herein described method of making a rubber solution for the manufacture of dipped goods and the like which consists in adding to a solution of rubber in a volatile solvent a small proportion of butyl aldehyde.

2. The hereindescribed method of making a rubber solution for the manufacture of dipped goods and the like which consists in adding to a suitable liquid rubber cement butyl aldehyde in the proportion of from three to ten per cent.

3. A rubber article of manufacture produced by the dipped process, containing a small proportion of butyl aldehyde.

4. A rubber article of manufacture produced by a deposit of rubber from a volatile solution, which article contains a small proportion of butyl aldehyde.

5. A liquid rubber cement comprising a solution of rubber in a volatile solvent containing a small proportion of butyl aldehyde.

In testimony whereof I affix my signature.

MARION M. HARRISON.